Jan. 21, 1964  F. MÜLLNER  3,119,032
ARRANGEMENT FOR COOLING TURBO-GENERATORS
Filed Oct. 10, 1960
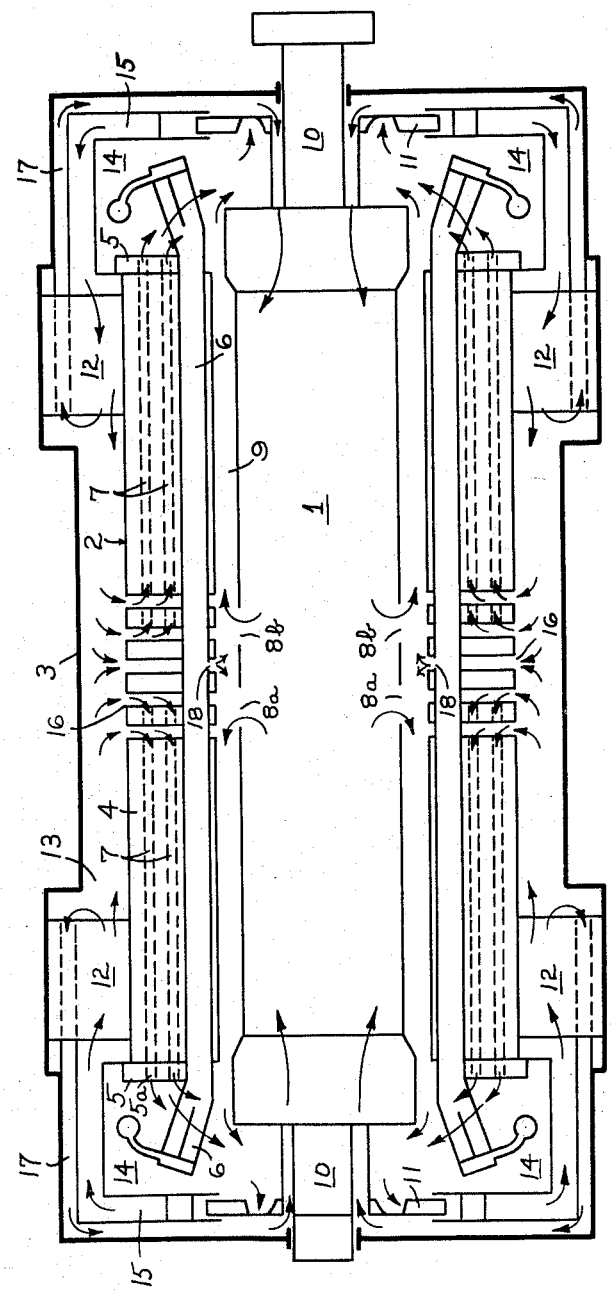
INVENTOR
Friedrich Müllner
BY Pierce, Scheffler & Parker
ATTORNEYS

United States Patent Office 3,119,032
Patented Jan. 21, 1964

3,119,032
ARRANGEMENT FOR COOLING TURBO-GENERATORS
Friedrich Müllner, Mannheim, Germany, assignor to Aktiengesellschaft Brown, Boveri & Cie, Baden, Switzerland, a joint-stock company
Filed Oct. 10, 1960, Ser. No. 61,744
Claims priority, application Switzerland Oct. 31, 1959
4 Claims. (Cl. 310—57)

This invention relates to an improved arrangement for cooling turbo-generators, and more particularly to cooling systems wherein the rotor winding as well as the stator iron are cooled by means of a gas and wherein the stator winding is cooled by circulating a liquid coolant therethrough.

This type of dynamoelectric machine, which must be built today for very high electrical outputs has a considerable length which involves certain difficulties regarding direct cooling of the conductors. The tendency is, therefore, to improve the removal of the heat losses by novel measures in such manner that a rational and effective cooling is easily achieved, even for generators which have very long conductor lengths.

The general object of the present invention is to thus obtain a further improvement with regard to the presently known expedients, and the desired result is obtained in accordance with the invention by circulating a gaseous coolant through channels which extend longitudinally within the body of the stator iron from each end thereof toward the middle. Entrance slots to these channels extend radially inward from the exterior surface of the stator in a region substantially midway between the stator ends and the gaseous coolant after passing radially inward through these entrance slots flows in opposite directions through the cooling channels to the stator ends from whence it issues through pressure plates and is then recirculated back to the entrance slots by means of fans located on opposite ends of the rotor shaft, the heat transferred to the gaseous coolant from the stator iron being extracted in suitable heat exchangers before it again reaches the entrance slots to the stator iron.

A further feature of the invention resides in the fact that a part of the gaseous coolant after leaving the heat exchangers is conducted to opposite ends of the rotor and flows in opposite directions through longitudinally extending channels provided in the rotor body towards the center of the rotor. The gaseous coolant then passes radially outward from the body of the rotor through suitable orifices into the air gap between the rotor and stator and flows in opposite directions back to that end of the rotor from whence it came, the gaseous coolant then re-entering the intake side of the fans together with the gaseous coolant discharged from the pressure plates at the ends of the stator iron.

Another feature of the invention resides in the fact that some of the radial entrance slots at the middle part of the stator iron extend completely through the body of the stator iron so that a part of the gaseous coolant flows into the air gap and serves to cool the dead space between the exit orifices on the rotor.

The foregoing objects and advantages of the invention will become more apparent from the following detailed description of one suitable embodiment thereof and from the accompanying drawing, the single figure of which shows a turbo-generator in central longitudinal section with the improved cooling arrangement.

With reference now to the drawing, the turbo-generator is comprised of a rotor 1 and a stator 2 which surrounds the rotor, the rotor and stator elements being enclosed within a gas-tight casing 3 which is filled with a gaseous coolant such as, for example, hydrogen. The stator 2 comprises a stator iron pack 4 having pressure plates 5 applied thereto at each end, and a stator winding 6 which passes longitudinally through the iron pack from one end to the other in slots provided therefor. The stator iron pack is also provided with cooling channels 7 passing longitudinally therethrough for circulation of the gaseous coolant. The individual conductors of the stator winding 6 are cooled directly by means of a liquid coolant such as, for example, water or oil. This cooling can be effected by passing the liquid coolant through the conductors themselves which would then be made hollow, or special longitudinally extending cooling ducts can be included in the winding slots provided in the iron pack.

The rotor 1 is likewise provided with longitudinally extending cooling channels for direct cooling of the conductors wound upon the rotor, this technique itself being known, and these cooling channels are connected at the center of the rotor, i.e. midway between the ends thereof, with ports 8a, 8b which communicate with the air gap 9 between the rotor and stator elements. A fan 11 is provided at each end of the rotor shaft 10 and thus rotates with rotation of this shaft. A plurality of heat exchangers or coolers 12 for removing from the gaseous coolant the heat picked up from the rotor and stator are arranged within the casing 3 at each end thereof and these are located in the annular space 13 between the outer periphery of the stator iron pack 4 and the interior surface of the casing wall.

The improved cooling arrangement operates in the following manner.

Due to the suction effect created by rotation of the fans 11, the gaseous coolant is drawn axially into the intake sides of these fans at the end spaces 14 within casing 3 and is discharged radially outward into ducts 15 provided within these end spaces. These ducts extend radially outward towards the periphery of the casing and then turn horizontally so as to deliver the gaseous coolant into the annular space 13 provided between the periphery of the stator iron pack 4 and the casing wall in which the heat exchangers 12 are located, the coolant being passed through the heat exchangers and then proceeding longitudinally towards the middle portion of the stator where it enters a plurality of slots 16 which extend radially into the stator iron pack 4 and communicate with the horizontally extending channels 7. After passing radially inward through slots 16, the gaseous coolant is turned through 90° and flows through channels 7 in opposite directions from the middle of the stator towards the ends taking on heat from the interior of the iron pack 4. The coolant then passes outward through apertures 5a in the pressure plates 5 aligned with channels 7 into the end space 14 where it re-enters the fans 11 and is then re-circulated, giving up its heat in the heat exchangers 12 before re-entering the slots 16 at the middle part of the stator iron pack 4.

In order to cool the rotor 1, for example, a part of the gaseous coolant after leaving heat exchangers 12 is permitted to flow through by-pass ducts 17 provided within each end of the casing to the corresponding end of the rotor where it enters the longitudinally extending cooling channels previously referred to and flows towards the middle of the rotor, taking up heat from the rotor as it passes through these channels. The gaseous coolant then passes radially outward from the rotor through the ports 8a, 8b into the air gap 9 and flows longitudinally through the gap in opposite directions towards the rotor ends into the end spaces 14 where it re-enters the fans 11.

The dead space at the middle portion of the rotor between the longitudinally spaced ports 8a, 8b can be cooled by gas from some of the slots 16 which are extended radially inward through the entire thickness of the stator iron pack 4 and terminate in ports 18 at the air gap 9 located intermediate the rotor ports 8a, 8b.

In the embodiment of the invention which has been illustrated, the same fans are used for circulating the gaseous coolant through the stator and also through the rotor. However, it is possible to use the illustrated fan only for circulating the gaseous coolant through the stator and to provide additional fans on the rotor shaft which function to circulate the gaseous coolant through only the rotor.

For cooling the conductors which comprise the stator winding 6, a liquid coolant is conducted in a closed circuit longitudinally through the conductors themselves which can be made hollow for this purpose. The liquid is introduced into the hollow conductors at one end of the stator and is removed from the opposite end. Circulation of the liquid coolant is effected, in known manner, by means including a pump and heat exchanger for extracting heat picked up by the liquid. These components which are located outside casing 3 have not been illustrated. The cooling channels within the stator conductors for extracting heat therefrom are so dimensioned that the non-symmetrical temperature rise created in the stator winding due to the unilateral flow of the liquid coolant from one end of the stator to the other is limited to a few degrees. The total thermal symmetry of the turbo-generator thus practically remains undisturbed.

The number and cross-sections of the cooling channels 7 in the stator iron pack 4 can be so dimensioned that the temperature rise in the pack will be very low, for example, less than 15° C. from the middle to the ends, while a higher rise in gas temperature can be allowed in the pressure plates 5. By this measure, one obtains, despite a lower temperature in the active parts, a high gas temperature at the outlet from the inactive pressure plate and the rotor. A small amount of circulated gas is thus sufficient, and from this results small heat exchangers, small fans and low impeller losses.

There is also the additional advantage that the longitudinal flow in the stator iron permits of a simple structure of the iron pack, since only a few radial slots have to be provided near the middle of the stator iron. The flow of the gaseous coolant in the iron pack is required to be deflected only once by 90° so that the resistance-to-flow remains quite low.

I claim:

1. A turbo-generator comprising a rotor, a stator surrounding said rotor, means for circulating a liquid coolant in a closed circuit in heat transfer relation with the conductors of the stator winding which extend longitudinally from one end of the stator to the other, a pressure plate at each end of said stator, a gas-tight casing enclosing said stator and rotor and containing a gaseous coolant, said stator also being provided with a plurality of cooling channels for circulating the gaseous coolant extending longitudinally therein from each end towards the middle, and also being provided with a plurality of entrance slots at the middle portion thereof and which extend radially inward from the outer surface thereof to said longitudinally extending cooling channels, said pressure plates being provided with apertures therethrough in alignment with said longitudinally extending cooling channels, a fan on each end of said rotor for circulating the gaseous coolant through said cooling channels in opposite directions from the middle portion towards the stator ends and thence through the apertures in said pressure plates, the intakes of said fans being in communication respectively with the gaseous coolant as it is discharged from the respective pressure plate at the stator ends and the discharge sides of said fans being in communication with said entrance slots, and heat exchangers located in the flow paths of said gaseous coolant between said fans and entrance slots for extracting heat from said coolant.

2. A turbo-generator as defined in claim 1 wherein said rotor is also provided with a plurality of cooling channels extending longitudinally therein from each end toward the middle and exit ports from said channels into the air gap between said rotor and stator, and means for circulating a portion of said gaseous coolant after leaving said heat exchangers in opposite directions through said cooling channels in said rotor from the ends thereof toward the middle and thence in opposite directions after leaving said exit ports longitudinally through said air gap back to the rotor ends.

3. A turbo-generator as defined in claim 2 wherein the same fans as are used for circulating the gaseous coolant through said stator are also used for circulating the gaseous coolant through said rotor.

4. A turbo-generator as defined in claim 2 and wherein said stator includes additional entrance slots at the middle portion thereof extending radially inward completely through the body of the stator and having outlets to said air gap located between longitudinally spaced exit ports on said rotor.

References Cited in the file of this patent

UNITED STATES PATENTS

| 2,707,244 | Kilgore | Apr. 26, 1955 |
| 2,722,616 | Moses | Nov. 1, 1955 |
| 2,817,780 | Loutrel | Dec. 24, 1957 |